US012559405B2

(12) United States Patent
Olbert et al.

(10) Patent No.: US 12,559,405 B2
(45) Date of Patent: Feb. 24, 2026

(54) PROCESS OF MANUFACTURING HOLLOW SPHERICAL GLASS PARTICLES

(71) Applicant: Omya International AG, Oftringen (CH)

(72) Inventors: Gerhard Olbert, Ludwigshafen am Rhein (DE); Laila Raquel Pasin E Matos, Ludwigshafen am Rhein (DE); Ekaterina Helwig, Ludwigshafen am Rhein (DE)

(73) Assignee: Omya International AG, Oftringen (CH)

( * ) Notice: Subject to any disclaimer, the term of this patent is extended or adjusted under 35 U.S.C. 154(b) by 649 days.

(21) Appl. No.: 17/793,987

(22) PCT Filed: Jan. 13, 2021

(86) PCT No.: PCT/EP2021/050570
§ 371 (c)(1),
(2) Date: Jul. 20, 2022

(87) PCT Pub. No.: WO2021/148285
PCT Pub. Date: Jul. 29, 2021

(65) Prior Publication Data
US 2023/0110412 A1     Apr. 13, 2023

(30) Foreign Application Priority Data

Jan. 24, 2020    (WO) ................ PCT/EP2020/051743

(51) Int. Cl.
*C03B 19/10*        (2006.01)
*C03C 3/04*         (2006.01)
(Continued)

(52) U.S. Cl.
CPC ...... *C03B 19/1075* (2013.01); *C03B 19/1095* (2013.01); *C03C 3/062* (2013.01); *C03C 3/083* (2013.01); *C03C 11/002* (2013.01)

(58) Field of Classification Search
CPC ........................... C03B 19/107; C03C 11/002
See application file for complete search history.

(56) References Cited

U.S. PATENT DOCUMENTS

| 2,431,884 A | 12/1947 | Neuschotz |
| 2,947,115 A | 8/1960 | Wood |

(Continued)

FOREIGN PATENT DOCUMENTS

| AT | 15001 U1 | 10/2016 |
| CN | 86104731 A | 1/1987 |

(Continued)

OTHER PUBLICATIONS

International Preliminary Report on Patentability received for PCT Patent Application No. PCT/EP2021/050570, mailed on Apr. 6, 2022, 12 pages.

(Continued)

*Primary Examiner* — Erin Snelting
(74) *Attorney, Agent, or Firm* — ALGM LLP; Harry J. Guttman

(57) ABSTRACT

Process for the preparation of hollow spherical glass particles comprising at least $SiO_2$, $Al_2O_3$, and an alkali metal oxide, wherein the process comprises the preparation of precursor particles comprising at least $SiO_2$, $Al_2O_3$, and an alkali metal oxide by mixing the starting materials, slurrying the starting materials with water followed by spry-drying and heat-treating the obtained precursor-particles at a temperature from 1000° C. to 1800° C., preferably from 1300° C. to 1600° C. by contacting the precursor particles with at least one naked flame.

11 Claims, 9 Drawing Sheets

Figure 1:
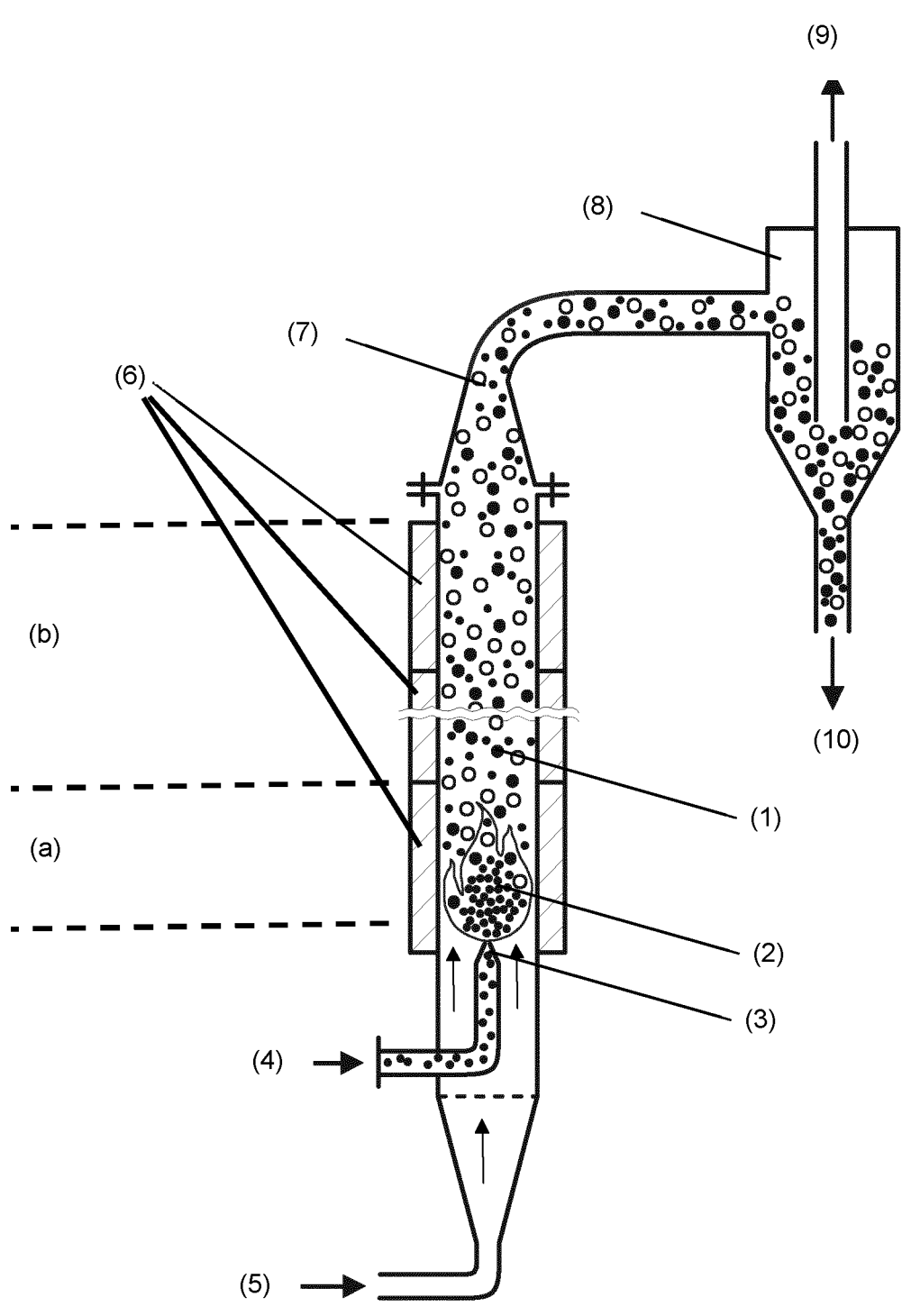

(51) Int. Cl.
| | |
|---|---|
| *C03C 3/062* | (2006.01) |
| *C03C 3/083* | (2006.01) |
| *C03C 11/00* | (2006.01) |

(56) References Cited

U.S. PATENT DOCUMENTS

| | | | |
|---|---|---|---|
| 2,978,339 A | | 4/1961 | Veatch et al. |
| 3,230,064 A | | 1/1966 | Veatch et al. |
| 3,361,549 A | | 1/1968 | Nakajima |
| 3,699,050 A | | 10/1972 | Henderson |
| 3,838,998 A | | 10/1974 | Matthews et al. |
| 4,017,290 A | | 4/1977 | Budrick et al. |
| 4,046,548 A | | 9/1977 | Wood et al. |
| 4,133,854 A | | 1/1979 | Hendricks |
| 4,257,798 A | | 3/1981 | Hendricks et al. |
| 4,303,431 A | | 12/1981 | Torobin |
| 4,336,338 A | | 6/1982 | Downs et al. |
| 4,391,646 A | | 7/1983 | Howell |
| 4,400,191 A | | 8/1983 | Youngberg et al. |
| 4,448,599 A | | 5/1984 | Mackenzie et al. |
| 4,475,936 A | | 10/1984 | Aston et al. |
| 4,487,620 A | | 12/1984 | Neusy |
| 4,519,777 A | | 5/1985 | Akhtyamov |
| 4,602,962 A | | 7/1986 | Fehlmann |
| 4,693,739 A | | 9/1987 | Manabe et al. |
| 4,767,726 A | | 8/1988 | Marshall |
| 4,778,502 A | | 10/1988 | Garnier et al. |
| 4,801,411 A | | 1/1989 | Wellinghoff et al. |
| 5,002,696 A | | 3/1991 | White |
| 5,004,488 A | * | 4/1991 | Mehrotra ............... C03C 12/00 264/117 |
| 5,176,732 A | | 1/1993 | Block et al. |
| 5,611,833 A | | 3/1997 | Brahmbhatt et al. |
| 5,849,055 A | | 12/1998 | Arai et al. |
| 6,221,326 B1 | | 4/2001 | Amiche |
| 6,245,700 B1 | | 6/2001 | Budd et al. |
| 6,360,563 B1 | | 3/2002 | Gerhardt et al. |
| 6,531,222 B1 | | 3/2003 | Tanaka et al. |
| 8,058,320 B2 | | 11/2011 | Ejiri et al. |
| 9,040,157 B2 | | 5/2015 | Hao et al. |
| 9,321,906 B2 | | 4/2016 | Takeishi et al. |
| 2001/0043996 A1 | | 11/2001 | Yamada et al. |
| 2002/0004111 A1 | | 1/2002 | Matsubara et al. |
| 2002/0045146 A1 | | 4/2002 | Wang et al. |
| 2002/0121108 A1 | | 9/2002 | Streicher et al. |
| 2006/0084724 A1 | | 4/2006 | Senturk |
| 2006/0122049 A1 | | 6/2006 | Marshall et al. |
| 2008/0096018 A1 | | 4/2008 | Zhang et al. |
| 2010/0204342 A1 | | 8/2010 | Kawasaki et al. |
| 2011/0152056 A1 | | 6/2011 | Qi |
| 2011/0265408 A1 | | 11/2011 | Jha et al. |
| 2013/0291590 A1 | | 11/2013 | Qi et al. |
| 2014/0249058 A1 | | 9/2014 | Wu et al. |
| 2014/0291582 A1 | | 10/2014 | Brunnmair |
| 2015/0059407 A1 | * | 3/2015 | Lehmann ............. C03B 19/095 65/21.4 |
| 2015/0132576 A1 | | 5/2015 | Qi |
| 2015/0315075 A1 | | 11/2015 | Pham et al. |
| 2016/0152513 A1 | | 6/2016 | Morris |
| 2016/0221856 A1 | | 8/2016 | Dennert |
| 2017/0174561 A1 | | 6/2017 | Isaev |
| 2019/0135675 A1 | | 5/2019 | Neidhardt |
| 2019/0337838 A1 | | 11/2019 | Isaev |

FOREIGN PATENT DOCUMENTS

| | | | | |
|---|---|---|---|---|
| CN | 1017888 B | 8/1992 | | |
| CN | 1216565 A | 5/1999 | | |
| CN | 101296874 A | 10/2008 | | |
| CN | 101679049 A | 3/2010 | | |
| CN | 101704632 A | 5/2010 | | |
| CN | 102459503 A | 5/2012 | | |
| CN | 102583973 A | 7/2012 | | |
| CN | 104520245 A | 4/2015 | | |
| CN | 105236947 A | 1/2016 | | |
| CN | 108191219 A | 6/2018 | | |
| DE | 19937861 A1 | 2/2001 | | |
| DE | 102015209516 A1 | 12/2016 | | |
| EP | 0601594 A1 | 6/1994 | | |
| EP | 858434 B1 | * | 2/2002 | ............... B01J 2/16 |
| EP | 3184494 A1 | 6/2017 | | |
| GB | 2178024 A | 2/1987 | | |
| JP | 58-156551 A | 9/1983 | | |
| JP | 02-077768 A | 3/1990 | | |
| JP | H0277768 A | 3/1990 | | |
| JP | 07-277768 A | 10/1995 | | |
| JP | 3579966 B2 | 10/2004 | | |
| JP | 2007051019 A | 3/2007 | | |
| JP | 2014510011 A | 4/2014 | | |
| JP | 2015206102 A | 11/2015 | | |
| TW | 201630838 A | 9/2016 | | |
| WO | 97/42127 A1 | 11/1997 | | |
| WO | 2007/102569 A1 | 9/2007 | | |
| WO | 2012/134679 A2 | 10/2012 | | |
| WO | 2014/199241 A1 | 12/2014 | | |
| WO | 2017/040900 A1 | 3/2017 | | |
| WO | 2017/108831 A1 | 6/2017 | | |
| WO | 2020/020921 A1 | 1/2020 | | |

OTHER PUBLICATIONS

International Search Report and Written Opinion received for PCT Patent Application No. PCT/EP2021/050570, mailed on Apr. 8, 2021, 10 pages.

International Search Report received for PCT Patent Application No. PCT/EP2020/051743, mailed on Oct. 12, 2020, 3 pages.

European Search Report for EP Patent Application No. 18185918.2, Issued on Nov. 9, 2018, 3 pages.

International Search Report and Written Opinion received for PCT Patent Application No. PCT/EP2019/069865, mailed on Sep. 26, 2019, 9 pages.

International Preliminary Report on Patentability received for PCT Patent Application No. PCT/EP2019/069865, mailed on Feb. 4, 2021, 8 pages.

U.S. Appl. No. 17/263,429 PatentCenter (without cited IDS documents) from Jan. 26, 2021 to Mar. 18, 2025, 355 pages.

3M(Trademark) Glass Bubbles- K Series, S Series and iM Series, Product Information-3M, 2013, 4 pages.

Al-Gemeel, et al., "Use of hollow glass microspheres and hybrid fibres to improve the mechanical properties of engineered cementitious composite", Construction and Building Materials, vol. 171, 2018, pp. 858-870.

Davies, et al., "Chapter 10—Failure of polymer matrix composites in marine and off-shore applications", Failure Mechanisms in Polymer Matrix Composites, 2012, pp. 300-336.

Sung, et al., "A Study on the Fabrication of Hollow Glass Sphere Using Precursor Particles Prepared by Spray Drying Method", Hwahak Konghak, vol. 38, No. 4, 2000, 497-502. (in Korean with English abstract on p. 497).

U.S. Appl. No. 17/263,429 PatentCenter (without cited IDS documents) from Apr. 24, 2025 to Jul. 21, 2025, 57 pages.

U.S. Appl. No. 17/263,429 PatentCenter (without cited IDS documents) from Jul. 22, 2025 to Oct. 28, 2025, 26 pages.

* cited by examiner

PROCESS OF MANUFACTURING HOLLOW SPHERICAL GLASS PARTICLES

CROSS-REFERENCE TO RELATED APPLICATIONS

This application is a national stage application (under 35 U.S.C. § 371) of PCT/EP2021/050570, filed Jan. 13, 2021, which claims benefit of European Application No. PCT/EP2020/051743, filed Jan. 24, 2020, both of which are incorporated herein by reference in their entirety.

The present invention relates to a process for the preparation of hollow spherical glass particles comprising at least $SiO_2$, $Al_2O_3$, and an alkali metal oxide, wherein the process comprises the preparation of precursor-particles comprising at least $SiO_2$, $Al_2O_3$, and an alkali metal oxide by mixing the starting materials, slurrying the starting materials with water followed by spray drying and heat-treating the precursor-particles at a temperature from 1000° C. to 1800° C., preferably from 1300° C. to 1600° C. by contacting the precursor-particles thus obtained with at least one naked flame.

Hollow spherical glass particles, also known as hollow glass microspheres, are used as fillers for materials in various fields of application. The specific gravity of such hollow spherical glass particles is significantly lower as compared with other fillers while the physical properties such as heat resistance, pressure resistance and impact resistance remain on a high level. Therefore, hollow spherical glass particles are widely used fillers for weight-reduced articles containing molded resin or metal components, e.g. automotive parts, household articles, sealing materials or construction materials. Examples of such hollow spherical glass particles and their manufacture have been described for example in U.S. Pat. Nos. 3,699,050, 4,336,338, 5,176, 732, and US 2002/0004111 A1.

The methods known in the art for producing hollow spherical glass particles usually involve the dispersion of a fine glass powder in a hot gas of high temperature, wherein the glass is heated to a melt so that the viscosity of the molten material (starting from the outer layer) decreases. Simultaneously, a gas is formed by vaporization of an expansion agent present in the composition of the precursor-particles. Accordingly, due to the surface tension, the shape of the resulting particles will be spherical and at the same time, the particles will be hollow due to the gas formed within the particles.

Regarding the chemical composition of the hollow spherical glass particles, borosilicate glass is widely used due to its chemical and mechanical resistance. For instance, JP-A-58-156551 discloses a process for forming hollow borosilicate glass microspheres from starting materials such as $SiO_2$, $H_3BO_3$, $CaCO_3$, $Na_2CO_3$, $NH_4H_2PO_4$ and $Na_2SO_4$. However, due to regulatory requirements, the application of boron-free hollow aspherical glass particles is preferred. Furthermore, boron may make the particles brittle.

WO 2017/108831 A1 discloses a method for the preparation of boron-free hollow spherical alumosilicate glass particles using $Al_2O_3$, $SiO_2$ and at least one alkali metal oxide as starting materials by mixing the starting materials with water and spray drying the mixture, thereby obtaining precursor-particles having an average particle size from 80 µm to 400 µm and a residual moisture from 1% to 10%, and feeding the precursor particles into a heating device in a temperature range from 1500° C. to 1800° C., such that the dried mixture falls through the heating device for about 1 s to about 10 s, thereby yielding hollow spherical glass particles which preferably have a particle size from 10 µm to 600 µm. The heating device is a tube furnace comprising an outer heating mantle.

Our older application WO 2020/020921 A1 discloses a boron-free hollow spherical glass particle comprising at least 30 wt.-% of $Al_2O_3$, at least 35 wt.-% of $SiO_2$ and at least 18 wt.-% of at least one alkali metal oxide and having a particle diameter in the range from more than 20 µm to 75 µm. The application furthermore discloses a method of manufacturing such particles by providing a composition comprising at least 30 wt.-% of $Al_2O_3$, at least 35 wt.-% of $SiO_2$ and at least 18 wt.-% of at least one alkali metal oxide, wherein the components are present as fine particles having a particle size of s 10 µm, mixing the particles with water and optionally an organic binder, spray drying the particles and feeding the dried particles into a heating device, for example a tube furnace, such that the particles are blown upwards while the temperature is maintained above 1000° C., thereby obtaining hollow spherical glass particles. Alternatively, two heating devices connected in series may be used or at least a part of the particles is cycled back into the heating device. The tube furnaces described comprise an outer heating mantle.

JP-A-7-277768 discloses a method for manufacturing hollow glass spheres. As starting material a mixture of a glass powder and an inorganic material, preferably a carbonate or a sulfate powder which decomposes at higher temperatures thereby generating a gas is used. The mixture is converted to granules, for example by means of a spray dryer and the granules are thereafter supplied into an air stream of a temperature sufficient to decompose the inorganic material to generate a gas. Preferably, the heat treatment is carried out for 5 to 1000 ms in an air steam of about 1200 to 1600° C. In example 1, a glass powder (55% of $SiO_2$, 14% of $Al_2O_3$, 8% of $B_2O_3$, 1% of MgO, 21% of CaO and 1% of BaO; wt.-percentages) is mixed with $CaSO_4*2$ $H_2O$ and water to obtain a slurry which was spray dried to obtain granules with an average particle size of 50 µm. Thereafter, the granules were supplied into a gas burner air stream having a maximum temperature of 1500° C., heat-treated for about 100 milliseconds, and then collected by means of cyclone. The example does not teach, that the granules are brought into contact with the naked flames of the gas burner but only that the granules are fed to a hot air stream generated by the gas burner. No details about the device used for heating the granules in a hot air stream have been disclosed.

Tube furnaces comprising an outer heating mantle for heat-treating materials at temperatures above 1000° C. may be suitable if the diameter of the tube is not too large. However, with increasing diameter of the tube—as it may be necessary for production plants-heat transfer into the tube becomes increasingly difficult.

It was an objective of the present invention to provide an improved process of manufacturing hollow spherical glass particles, which also allows manufacturing hollow spherical glass particles in heating-devices having large inner diameters.

Accordingly, a process for the preparation of hollow spherical glass particles comprising at least $SiO_2$, $Al_2O_3$, and an alkali metal oxide has been found, wherein the process comprises at least the steps of (I) preparing precursor-particles by a process comprising at least the following sub-steps

(I-1) providing a starting composition comprising particles of at least one starting compound for forming a glass which comprises at least $SiO_2$, $Al_2O_3$, and an alkali metal oxide, (I-2) mixing the starting composition with a liquid, thereby obtaining a slurry, and (I-3) spray drying the obtained slurry, thereby obtaining the precursor-particles, and (II) heat-treating the precursor-particles at a temperature from 1000° C. to 1800° C. by passing the precursor-particles through a heating device, thereby obtaining hollow spherical glass particles, wherein at least one naked flame fed by a flammable gas is burning in the interior of the heating device and the heat-treatment is carried out by contacting the precursor-particles with the naked flame(s).

Preferably, the hollow spherical glass particles to be manufactured comprise at least 30 wt.-% of $SiO_2$, at least 25 wt.-% of $Al_2O_3$, and at least 18 wt.-% of the alkali metal oxide, in each case based on the overall weight of the hollow spherical glass particles, are boron-free, and their average diameter is from 20 μm to 200 μm.

LIST OF FIGURES

FIG. 1: Schematic representation of a vertical heating device in which the precursor-particles are added to the flammable gas.

Figure 2:
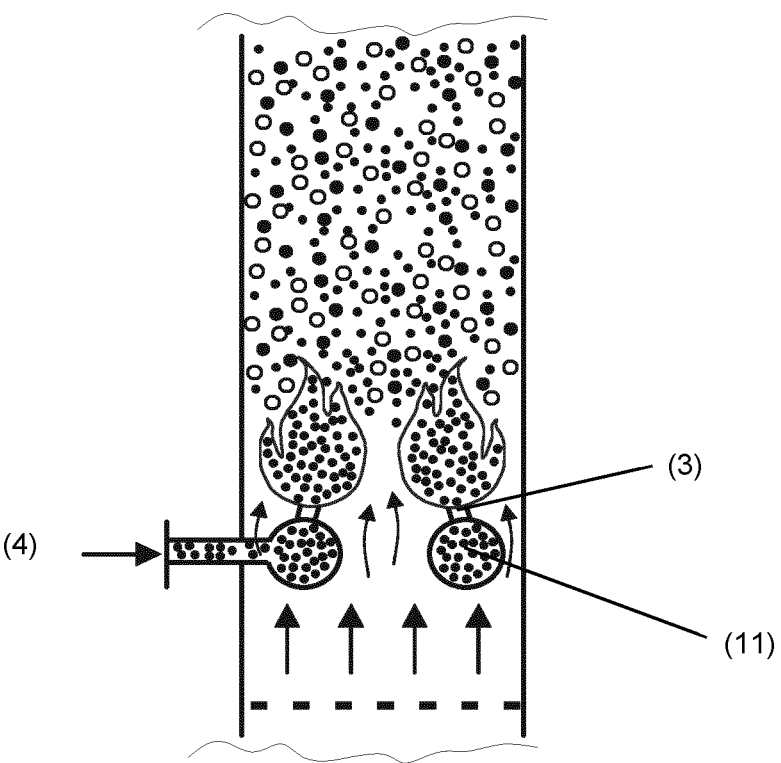

FIG. 2: Schematic representation of a heating device comprising a plurality of flames.

Figure 3:
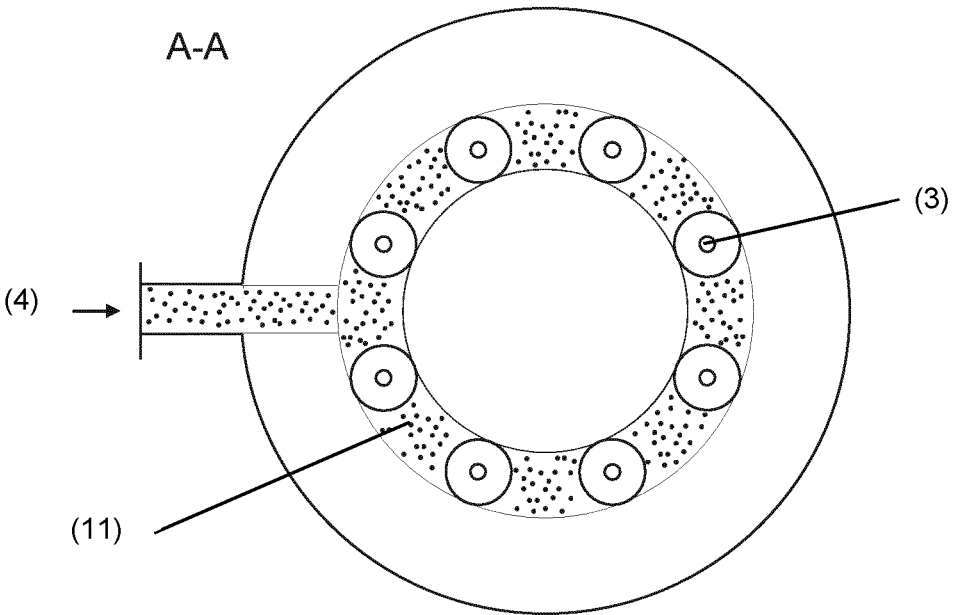

FIG. 3: Schematic representation of a distributor for flammable gas comprising 8 burner nozzles.

Figure 4:
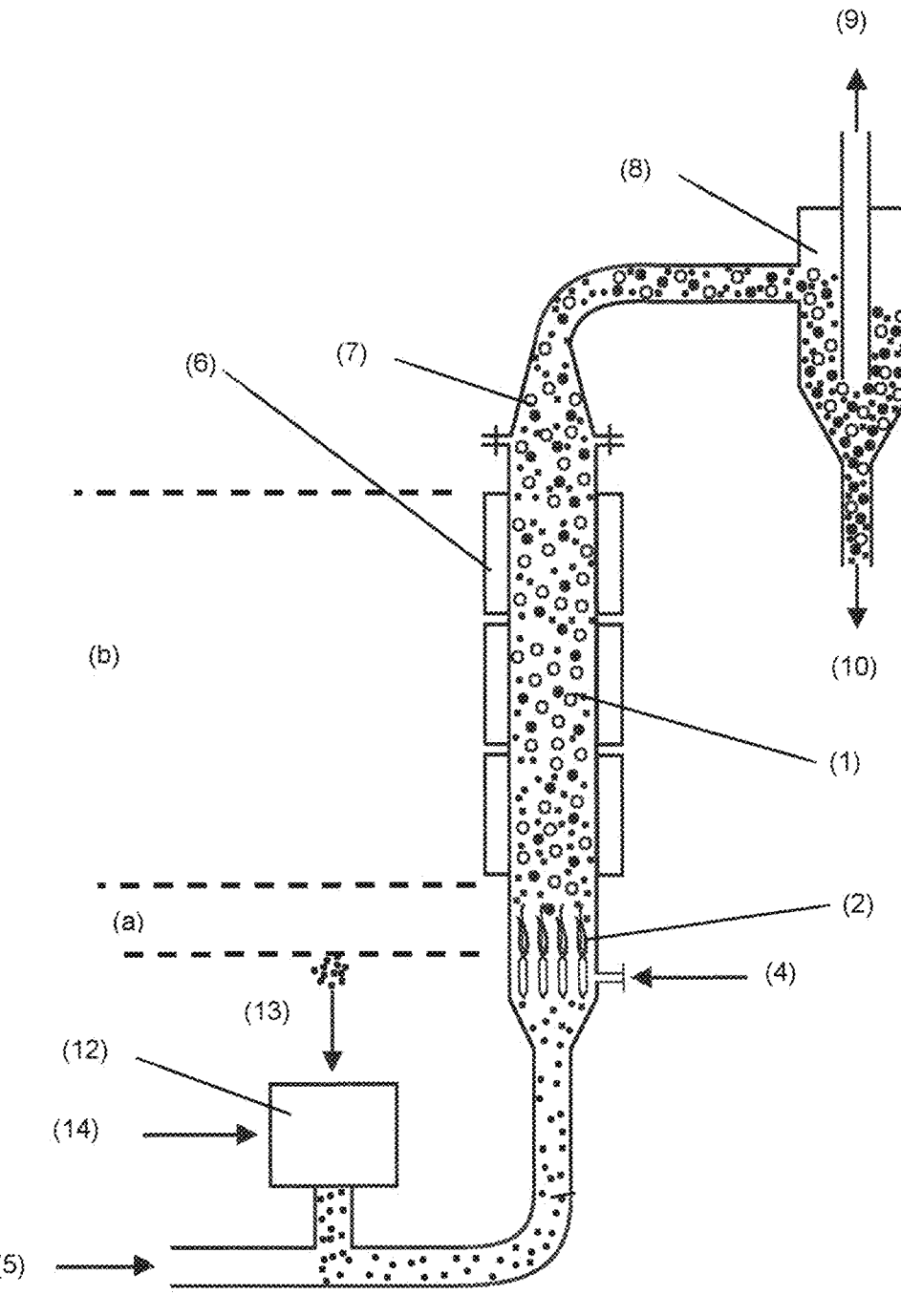

FIG. 4: Schematic representation of a vertical heating device in which the precursor-particles are added to a non-flammable carrier gas.

Figure 5:
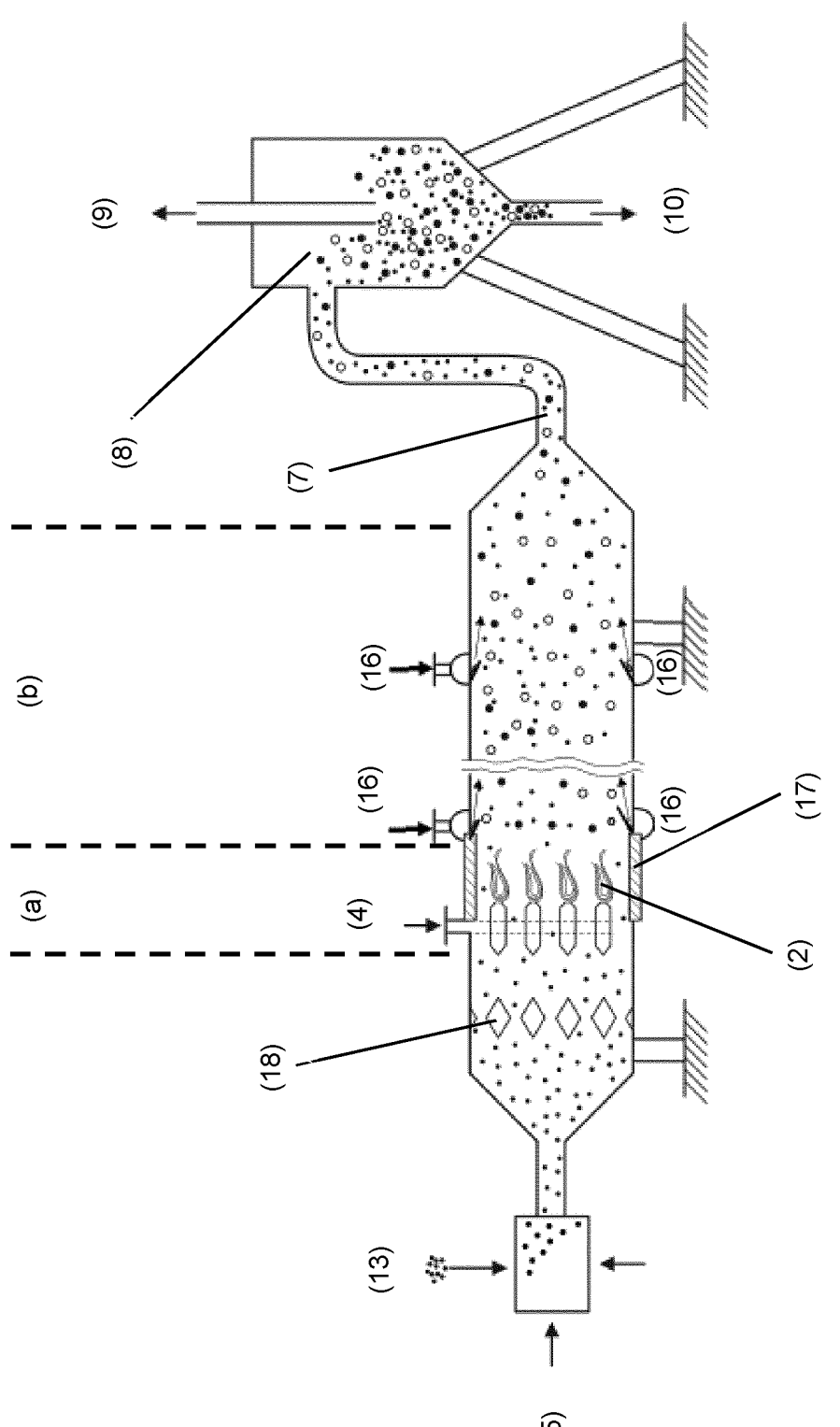

FIG. 5: Schematic representation of a horizontal heating device in which the precursor-particles are added to a non-flammable carrier gas comprising additional inlets for a gas for cooling the reactor walls.

Figure 6:
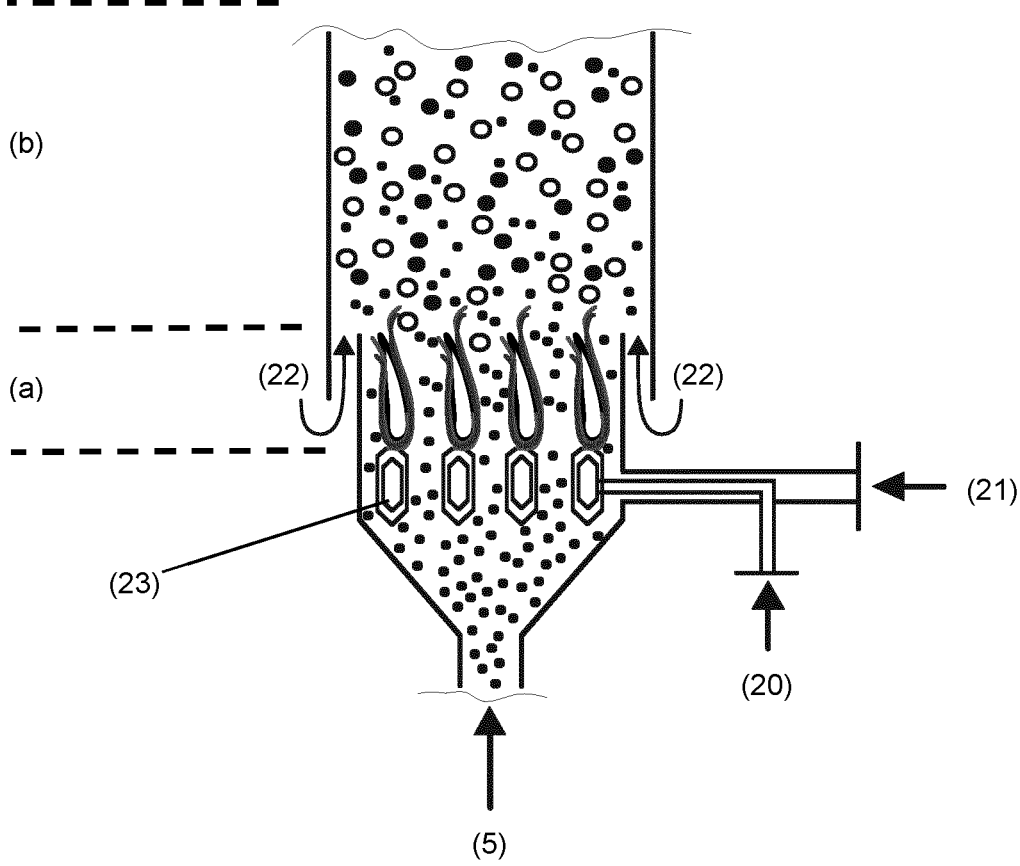

FIG. 6: Schematic representation of a vertical heating device in which the precursor-particles are added to a non-flammable carrier gas FIG. 7: Process flow diagram of a plant including recirculation of waste gas.

Figure 8:
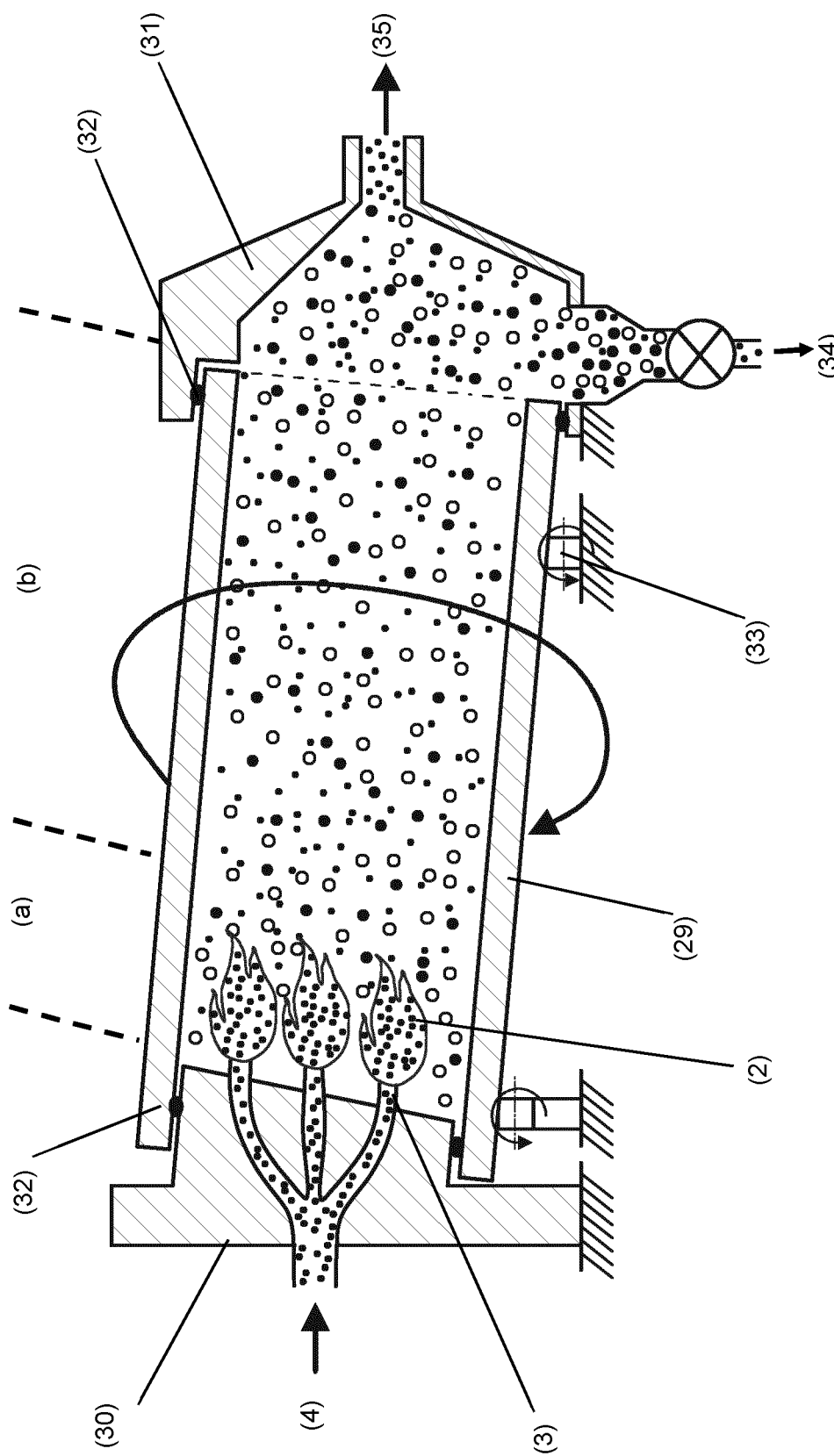

FIG. 8 Schematic representation of a rotary kiln in which the precursor-particles are added to the flammable gas.

Figure 9:
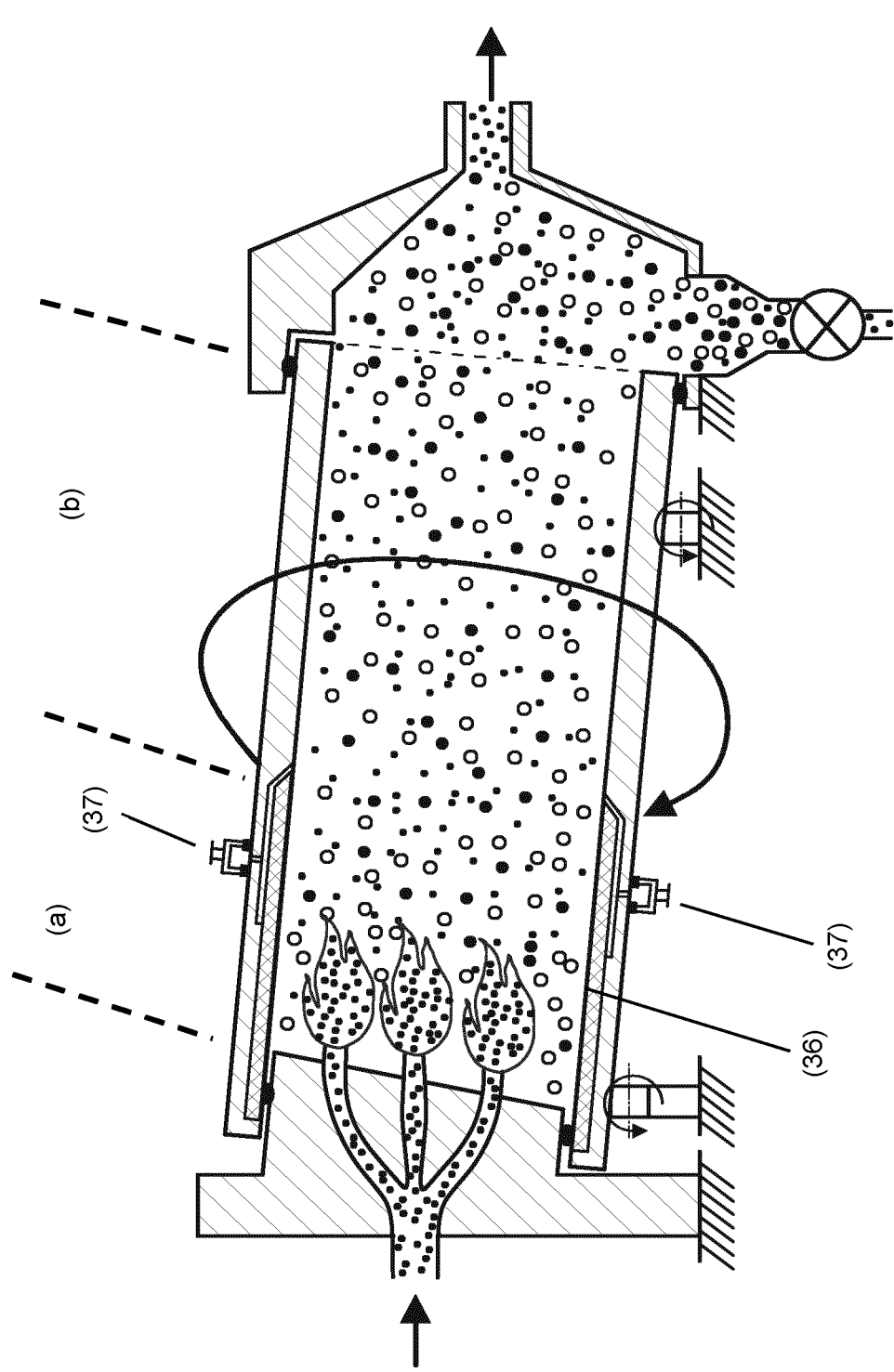

FIG. 9: Schematic representation of a rotary kiln in which the precursor-particles are added to the flammable gas comprising additional inlets for a gas for cooling the reactor walls.

Figure 10:
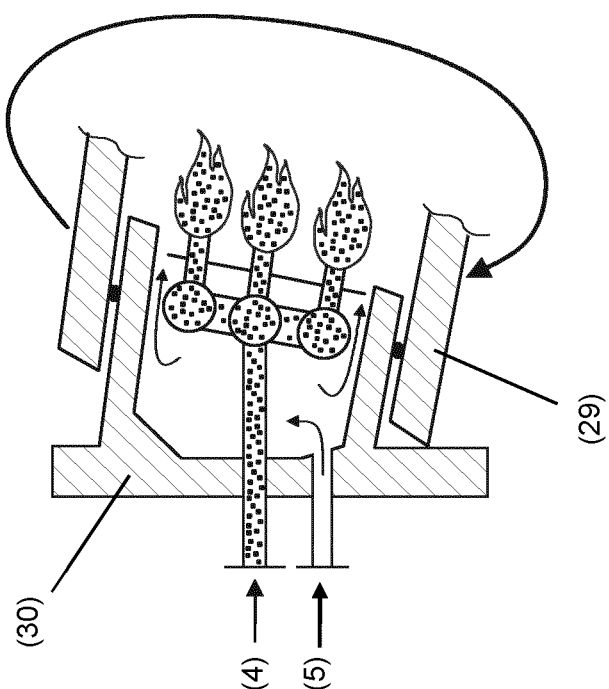

FIG. 10: Schematic representation of the front section of a rotary kiln in which the precursor-particles are added to the flammable gas and additionally a non-flammable gas is introduced.

Figure 11:
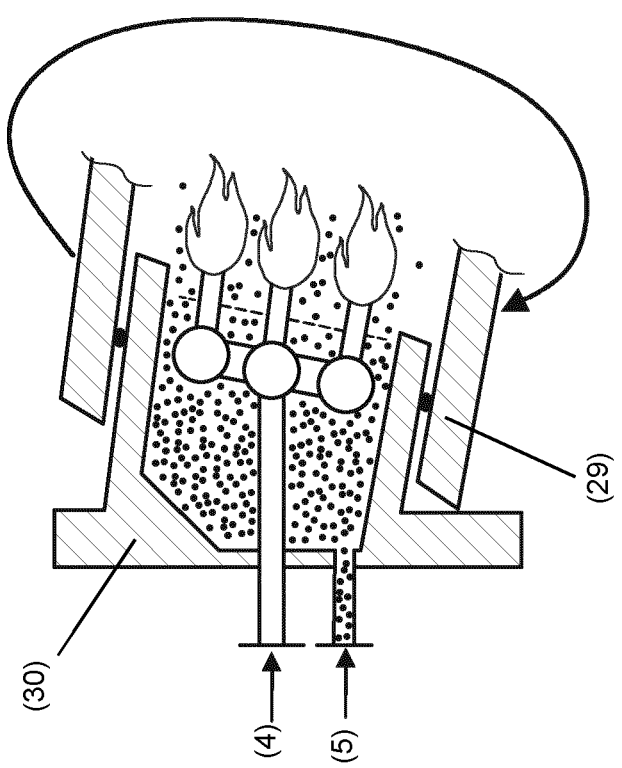

FIG. 11: Schematic representation of the front section of a rotary kiln in which the precursor-particles are added to a non-flammable carrier gas.

With regard to the invention, the following can be stated specifically:

Hollow Spherical Glass Particles

The composition of glass often is expressed by its contents of $SiO_2$, $Al_2O_3$, alkali metal oxides and optionally further oxides. Said description of the composition will also be used for the present invention.

The hollow spherical glass particles to be manufactured according to the process of the present invention comprise at least $SiO_2$, $Al_2O_3$, and an alkali metal oxide, preferably $Na_2O$.

Optionally, further components may be present.

Preferably, the hollow spherical glass particles to be manufactured according to the process of the present invention comprise at least 30 wt.-% of $SiO_2$, at least 25 wt.-% of $Al_2O_3$, and at least 18 wt.-% of an alkali metal oxide, preferably $Na_2O$, in each case based on the overall weight of the hollow spherical glass particles.

In one embodiment of the invention, the hollow spherical glass particles comprise from 30 wt.-% to 55 wt. % of $SiO_2$, from 25 wt.-% to 45 wt.-% $Al_2O_3$, and from 18 wt. % to 40 wt. % of an alkali metal oxide, preferably $Na_2O$, in each case based on the overall weight of the hollow spherical glass particles. In yet another embodiment of the invention, the hollow spherical glass particles comprise from 30 wt.-% to 40 wt. % of $SiO_2$, from 25 wt.-% to 35 wt.-% $Al_2O_3$, and from 30 wt. % to 40 wt. % of $Na_2O$, in each case based on the overall weight of the hollow spherical glass particles.

In one embodiment of the invention, the hollow spherical glass particles are free of boron. As used herein, the terms "free of boron" or "boron-free" shall not exclude that little amounts of boron may be present. In particular, it is preferred that the hollow spherical glass particle comprises boron—if any—in an amount equal or below 1.0 wt.-%, more preferably equal or below 0.1 wt.-%, still more preferably equal or below 0.01 wt.-%, like equal or below 0.001 wt.-%, based on the overall weight of the hollow spherical glass particles.

In one embodiment of the invention, the hollow spherical glass particles have an average particle size in the range from 20 to 200 μm, for example from 20 μm to 150 μm, or from 20 μm to 70 μm. The values relate to the number average as can be determined for example by microscopy.

In one embodiment of the invention, the hollow spherical glass particles have a wall thickness in the range from 0.1 to 15 μm, in particular in the range from 0.2 to 12 μm.

Further, it is preferred that the hollow spherical glass particles according to the present invention have a pressure collapse strength value in the range of 120 to 150 MPa. For the determination of the pressure collapse strength value, hollow spherical glass particles are transferred into a cylinder which is closed at the bottom and can be subjected to pressure on top by means of a punch. The hollow spherical glass particles are pressed by the punch as in a press. The filling height of the hollow spherical glass particles in the cylinder depends on the particle size. The cylinder is located in a tensile-/compression testing device controlling the force of the piston. Accordingly, a defined normal force or surface pressure is generated. The results are evaluated by determining the percentage of hollow spherical glass particles which have been destroyed by means of microscopy or macroscopy depending on the particle size. The cylinder used for the procedure has an inner diameter of 20 mm and a cylindrical inside length of 80 mm. The filling height was 20 mm. The criterion was based on 80% intact hollow spherical glass particles of the appropriate diameter.

Preferably, the hollow spherical glass particles have a bulk density in the range of 0.4 to 1.2 $g/cm^3$, more preferably in the range of 0.5 to 1.0 $g/cm^3$, still more preferably in the range of 0.6 to 0.9 $g/cm^3$, like in the range of 0.7 to 0.8 $g/cm^3$.

Process of Manufacturing Hollow Spherical Glass Particles

The process for manufacturing hollow spherical glass particles according to the present invention comprises at least 2 steps.

In the first step (I), precursor-particles comprising suitable glass forming components are made and in the second step (II), the precursor-particles are heat-treated at a temperature from 1000° C. to 1800° C. by means of a naked flame, thereby obtaining hollow spherical glass particles.

Step (I)—Preparation of the Precursor-Particles

Step (I) comprises at least three sub-steps (I-1), (I-2), and (I-3). In course of step (I-1), a starting composition for making the precursor-particles is provided. In course of step (I-2), the starting composition is mixed with a liquid, thereby obtaining an aqueous slurry of the starting materials and in course of step (I-3) the obtained aqueous slurry is spray dried, thereby obtaining the precursor-particles.

Step (I-1)

The starting composition for preparing the precursor-particles comprises particles of at least one starting material for forming a glass which comprises at least $SiO_2$, $Al_2O_3$, and an alkali metal oxide, preferably $Na_2O$. Preferably, a mixture of at least two different starting materials is used.

Starting materials for forming a glass which comprises at least $SiO_2$, $Al_2O_3$, and an alkali metal oxide, preferably $Na_2O$ basically are known in the art. Starting materials may comprise all of the components $SiO_2$, $Al_2O_3$, and an alkali metal oxide or only two of them or only one of them.

Examples of suitable starting materials for use in the present invention comprise alkali metal carbonates, in particular sodium carbonate, silicon dioxide, silicates, alumosilicates, for example zeolites, such as for example Zeolite A, clays, such as Kaolinite, mica or mixtures thereof.

The starting composition is capable of releasing a gas when heat-treated in course of step (II). Such a gas may be in particular carbon dioxide and/or water. Preferably, the gas may be released by the starting materials for forming a glass themselves but in other embodiments also additional expansion additives may be used for this purpose. Examples of starting materials releasing a gas upon heat treatment comprise alkali metal carbonates, such as sodium carbonate, which release $CO_2$ upon heating. Further examples comprise starting materials comprising chemically bound water, such as water containing silicates and/or alumosilicates. Examples comprise zeolites which may be represented by the general formula $M_{2/z}$ $O \cdot Al_2O_3 \cdot xSiO_2 \cdot yH_2O$, wherein M is an alkali or earth alkali metal cation, z is the charge of the cation, x is from about 1.8 to 12, and y is from 0 to about 8. A specific example is zeolite A which may be represented by the formula $Na_{12}((AlO_2)_{12}(SiO_2)_{12}) \cdot 27$ $H_2O$. Further examples comprise clays such as kaolinite. The gas released from the starting components in course of the heat-treating blows up the hollow spheres.

In one embodiment of the invention, the starting composition comprises at least a zeolite, for example zeolite A.

In another embodiment of the invention, the starting composition comprises at least a zeolite, for example zeolite A and an alkali metal carbonate, in particular sodium carbonate, preferably zeolite A and sodium carbonate.

In another embodiment of the invention, the starting composition comprises at least a zeolite, for example zeolite A, and a clay mineral, such as kaolin or kaolinite, preferably zeolite A and kaolin and/or kaolinite.

In yet another embodiment of the invention, the starting composition comprises at least a zeolite, for example zeolite A, and a clay mineral, such as kaolin or kaolinite, and an alkali metal carbonate, in particular sodium carbonate, preferably zeolite A, kaolin and/or kaolinite, and sodium carbonate.

In one embodiment of the invention, the starting composition is free of boron. The term "free of boron" has already been defined above.

The kind and amount of the starting materials in the starting composition is adjusted according to the intended composition of the glass, keeping in mind that the gases mentioned above or other volatile components which may be present are released from the composition in course of heat-treating in course of step (II). So, while the proportion of $SiO_2$, $Al_2O_3$ and alkali metal oxides in the starting composition is the same as in the glass, the absolute percentages in the starting composition may be lower due to the mass loss in course of heat-treatment.

Particles of the starting materials may be obtained by grinding. In one embodiment of the invention, the process comprises a step of grinding the staring materials. Grinding may be carried out before mixing the starting materials of after mixing the starting materials. The grinding process can be dry or wet. In one embodiment of the invention, the grinding process is carried out in such a manner that the particles in the starting composition have an average particle size of 10 μm or below, preferably of 7 μm or below. The particle size refers to the number average which may be determined by microscopy.

Step (I-2)

In course of step (I-2), the starting composition comprising particles of the starting materials as prepared in course of step (I-1) is mixed a liquid, thereby obtaining a slurry of the particles of the starting composition in a liquid.

The liquid may be one single component or may comprise a mixture of different components. Preferably, the liquid comprises water, i.e. it is an aqueous liquid. In one embodiment, only water is used a liquid for slurrying the particles.

The slurry may comprise up to about 80.0 wt.-% of the starting composition, for example from about 50 to about 75 wt.-%.

The slurry may additionally comprise further additives.

In one embodiment, the slurry may further comprise a dispersant. Examples of suitable dispersants comprise polymeric dispersants such as of polyvinyl pyrrolidone, polyacrylate, polyacrylate copolymers or mixtures thereof.

In another embodiment, a binding agent may be used. Such a binding agent may assist forming the precursor particles. Examples of binding agents include inorganic binding agents such as water glass or organic binding agents such as glycerin, glycol, xylitol, sorbitol, erythritol, starch, polyvinyl alcohols or mixtures thereof.

Step I-3

In step (I-3), the slurry obtained in step (I-2) is spray-dried, thereby obtaining the precursor-particles.

Devices for spray drying are known in the art and are commercially available. In one embodiment of the invention, the slurry is spray dried at a temperature in the range of 150° C. to 250° C. Said temperature relates to the entry temperature of the spray dryer. The precursor-particles obtained from spray drying are spherical or at least essentially spherical.

Each of the precursor-particles comprises a plurality of primary particles of the starting materials. The particle size of the precursor-particles is adjusted according to the intended particle size of the hollow spherical glass particles to me made. As a rule of thumb, with increasing particle size of the precursor-particles also the particle size of the hollow-spherical glass particles increases. It is known in the art how to adjust the particle size in course of a spray drying process by the process parameters. In one embodiment of the invention, the particle size of the precursor-particles is adjusted to 20 µm to 250 µm. The particle size refers to the number average which may be determined by microscopy.

Optionally, the precursor-particles obtained in course of step (I-3) may be screened, for example by sieving, in order to select only certain fractions of the precursor-particles for the heat-treatment in course of step (II). For example, very coarse precursor-particles and/or very fine precursor particles may be separated.

Step (II)—Heat-treating the precursor-particles

Summary

In course of step (II), the precursor-particles obtained in course of step (1) are heat-treated at a temperature from 1000° C. to 1800° C., preferably from 1300° C. to 1600° C., thereby obtaining hollow spherical glass particles. The heat treatment is carried out by passing the precursor-particles through a heating device, wherein at least one naked flame is burning in the interior of the heating device and the heat-treatment is carried out by contacting the precursor-particles with the naked flame(s). The flame is fed by a flammable gas which exits from at least one burner nozzle located in the interior of the heating device. Preferably, the heating device comprises a plurality of burner nozzles and consequently a plurality of flames is burning in the interior of the heating device. The contact time of the particles in the flame is short, for example from 0.001 s to 1 s.

Basically, any kind of heating device heated by at least one naked flame burning in its interior may be used.

Preferably, the heating device comprises a longitudinal reaction chamber, wherein the precursor-particles are introduced at one end of the elongated reaction chamber (the front end) and hollow spherical glass particles are removed at the other end of the longitudinal reaction chamber (the rear end). So, the particles are transported through the longitudinal reaction chamber from one end to the other while becoming chemically converted.

Examples of such heating devices comprise heating devices comprising cylindrical reaction chambers, but also other shapes are possible such as reaction chambers having a quadratic or a hexagonal cross section. Preferably, the heating device is a cylindrical heating device.

The diameter of the longitudinal reaction chamber, preferably the cylindrical reaction chamber may be chosen by the skilled artisan according to his/her needs. Because the heating device is internally heated by naked flame(s), there is no problem of heat-transfer into the reaction chamber and therefore advantageously, the inner diameter of the longitudinal reaction chamber may be made very large. It may be for example from 0.1 to 3 m, for example from 1 to 3 m without wishing to limit this invention by said numbers.

The term "diameter" in this context refers to the hydraulic diameter $d_h$=4 A/P, wherein A is the area of the cross section and P is the perimeter of the heating device. For a cylindrical heating device, i.e. a heating device having a circular cross section $d_h$ equals 4 $\pi r^2$/2 $\pi r$=2 r, wherein r is the radius of the circle. For a heating device having a quadratic cross section $d_h$ equals 4 $a^2$/4 a=a, wherein a is the edge length of the square. The hydraulic diameters for other shaped reaction chamber may be easily calculated by the skilled artisan.

The diameter of the reaction chamber may be constant in longitudinal direction or it may vary. By the way of example, the heating device may comprise a section having a constant diameter, for example a cylindrical section and towards the rear end its diameter decreases.

The longitudinal reaction chamber may be in horizontal or vertical or any other orientation. In one embodiment of the invention, it may be vertical or essentially vertical wherein the precursor-particles are introduced at the lower end and the hollow spherical glass particles formed are removed at the upper end.

In one embodiment of the invention, the heating device, comprises a fixed reaction chamber which is in horizontal or vertical or any other orientation. The heating device comprising a fixed longitudinal reaction chamber comprises at least one inlet for a flammable gas which is connected with at least one burner nozzle in its interior. Flammable gases are known in the art. Examples comprise hydrogen and hydrocarbons such as methane, ethane, or propane. There are several possibilities of mixing the flammable gas with oxygen or air for combustion. In certain embodiments of the invention, the burner nozzles are one-component nozzles and oxygen or air or any other gas necessary for combustion is mixed which the flammable gas before the gas exits from the burner nozzles, for example before the flammable gas enters into the heating device. In other embodiments, the burner nozzles used are two-component nozzles, such as for example a ring nozzle, and separate streams of oxygen or air and the flammable gas exit from the two-component nozzle. For this purpose, the heating device comprises a separate inlet for air or oxygen and separate pipes for the flammable gas and oxygen or air between the two component nozzles and the inlet.

Contacting the precursor-particles with the flame(s) may be carried out by dispersing the precursor-particles in the flammable gas itself so that a stream of a flammable gas comprising precursor-particles exits from the burner nozzle(s). In this embodiment, the precursor-particles pass through the entire flame and are converted into hollow spherical glass particles. After passing through the naked flame, the thus formed hollow spherical glass particles are cooled at least to such an extent that the glass particles become solid and transported by a stream of waste gas generated by the combustion through the heating unit towards an outlet from which hollow spherical glass particles can be collected. Cooling may be effectuated for example by cooling the walls of the heating device at a position downstream of the flame(s) and/or by introducing a non-flammable gas such as air or cooled reused gas from the process itself having ambient temperature into the heating device at a position downstream of the flame(s). The separation of the hollow spherical glass particles and the waste gas may be carried out for example by means of a cyclone. A heat exchanger in the line connecting the heating device and the device for separating may be used for further cooling the stream.

Optionally, a non-flammable gas may be added into the reaction chamber, for example at a position upstream of the naked flame(s). Such an additional non-flammable gas supports the transport of the hollow spherical glass particles towards to outlet and assists to avoid back-mixing. Examples of non-flammable gases comprise air, carbon dioxide or recovered waste gas.

In another embodiment, contacting the precursor-particles with the flame(s) may be carried out by dispersing the precursor-particles in a separate non-flammable gas which acts as a carrier gas for the precursor-particles and the stream of non-flammable gas comprising precursor particles is entered into the heating device at a position upstream of the naked flame(s). In this embodiment, the precursor particles do not pass centrally through the flame(s) but rather through the outer regions of the flame(s). As in the first embodiment, the non-flammable gas supports the transport of the hollow spherical glass particles towards to outlet and assists to avoid back-mixing. Of course, the two methods may be combined, i.e. precursor-particles may be added to both, the flammable gas and to the non-flammable gas.

In another embodiment, the heating device is a rotary kiln. It comprises a reaction chamber which is a cylindrical, rotating tube which in usual manner is in horizontal orientation or tilted slightly towards its rear end. Contacting the precursor-particles with the flame(s) may be carried out in the same manner as described above, i.e. by adding the precursor particles to the flammable gas or a non-flammable gas. The rotary motion of the cylindrical reaction chamber at least supports the transport of the particles through the reaction chamber in usual manner.

In one embodiment of the invention, the longitudinal reaction chamber of the heating device as described above, preferably the cylindrical reaction chamber comprises a combustion zone (a) and a cooling zone (b). The cooling zone (b) is located downstream of the combustion zone (a): The precursor-particles are introduced into the combustion zone (a) where they become converted to hollow spherical glass particles and the hollow spherical glass particles thus obtained are transported through the cooling zone (b) and are removed at the end of the cooling zone (b).

The combustion zone (a) is heated by at least one naked flame, preferably by a plurality of naked flames, which preferably extend over the entire cross-section of the cylindrical reaction device. Advantageously, the inner walls of the reaction chamber in the combustion zone (a) are protected by a refractory material to withstand the high temperatures. Suitable refractory materials are known in the art. Examples comprise ceramic materials based on aluminium and/or silicon oxides or carbidic materials such as silicon carbide. Also, OCMC (oxide ceramic matrix composite) materials may be used. In one embodiment, the entire cylindrical reaction chamber is made of refractory materials.

The combustion zone (a) is followed downstream by a cooling zone (b) which allows cooling the formed hollow spherical glass particles once they leave the flame(s) at least to a temperature at which the wall of the hollow spherical glass particles becomes solid. So, cooling does not necessarily mean cooling to room temperature but only said minimum requirement needs to be met. As it is known in the art, the melting point of glass strongly depends on its composition. In general, cooling the hollow spherical glass particles to a temperature which is about 500° C. less than its respective melt temperature is sufficient without wishing to limit the invention to this range.

Cooling already starts simply when the particles are no longer in contact with the flame(s). Furthermore, cooling may be effectuated by introducing a gas such as air, nitrogen or reused waste gas having ambient temperature into the heating device at a position downstream of the flame(s). In this embodiment, the reaction chamber comprises suitable means, such as for example lead-in tubes, which allows entering a cooling gas into the cooling zone (b). Preferably, lead-in tubes may be arranged such that a part of the gas stream is directed towards its interior and a part flows essentially parallel to the wall. Such an arrangement helps to avoid that the hollow spherical glass particles stick to the walls. In one embodiment, there may be two or three or even more cooling zones which allow stepwise cooling. Cooling may be furthermore supported for example by cooling the walls of the cooling zone (b). Cooling the walls may be effectuated by using double-walled material for the cooling zone (b) and introducing a cooling medium into the hollow space between the two walls. In order to protect the walls of the combustion zone (a), in one embodiment, also the walls of the combustion zone (a) may be cooled. For cooling, preferably, a stream of a gas at ambient temperatures may be blown into the hollow space through an inlet and hot gas removed through an outlet. The gas may be fresh gas such as air or nitrogen or it may also be reused gas from the process itself.

The heat-treatment yields a stream of hollow spherical glass particles in a waste gas stream and optionally an additional non-flammable gas. The separation of the hollow spherical glass particles and the waste gas may be carried out for example by means of a cyclone or by a filter.

DETAILED DESCRIPTION

In certain embodiments of the present invention, the heating device used for step (II) comprises at least
an inlet for a flammable gas,
an inlet for a non-flammable gas,
a longitudinal reaction chamber comprising at least two different zones (a) and (b), wherein
  (a) is a combustion zone capable of being heated by at least one naked flame, wherein at least one burner nozzle which is connected with the inlet of the flammable gas is arranged in the combustion zone,
  (b) is a cooling zone, and
an outlet for the hollow spherical glass particles, non-flammable gas and waste, and step (II) is carried out as follows:
(II-1) introducing a stream of the flammable gas through the inlet, transferring it to the burner nozzle(s) and igniting at least one naked flame,
(II-2) introducing a stream of the non-flammable gas through the inlet into the combustion zone (a) and transferring it through the cooling zone (b) to the outlet,
(II-3) adding the precursor-particles into the heating device and contacting them with the naked flame(s) in the combustion zone (a) by at least one method selected from
  adding the precursor-particles to the stream of the flammable gas, and/or
  adding the precursor-particles to the stream of the non-flammable gas,
  thereby obtaining a stream of hollow spherical glass particles, waste-gas generated by combustion of the flammable gas and non-non-flammable gas,
(II-4) cooling the formed stream of hollow spherical glass particles, waste-gas and non-flammable gas by passing them through the cooling zone (b), and
(II-5) separating the hollow spherical glass particles from the waste-gas and the non-flammable gas.

Preferably, the longitudinal reaction chamber is a cylindrical reaction chamber. In one embodiment, the longitudinal reaction chamber is in vertical orientation, wherein the combustion zone (a) is at its lower end and the cooling zone (b) is at its upper end.

FIG. 1 schematically represents a specific embodiment of a heating device suitable for use in the present process. It comprises a vertical, cylindrical reaction chamber and the precursor-particles are added to the flammable gas. The reaction chamber (1) is cylindrical and comprises two different zones, a combustion zone (a) and a cooling zone (b). In the combustion zone (a) a flame (2) is burning. The flame is fed by a flammable gas which exits from a burner nozzle (3). The heating device furthermore comprises one inlet for the flammable gas (4).

Details about flammable gases, burner nozzles and mixing flammable gases with air or oxygen have already been disclosed above. In the embodiment of FIG. 1, a one-component nozzle is shown and consequently a flammable gas pre-mixed with oxygen or air needs to be introduced through the inlet (4). The diameter of the reaction chamber may be chosen by the skilled artisan according to his/her needs. As detailed above, the term "diameter" refers to the hydraulic diameter of the reaction chamber. It may be for example from 0.1 to 3 m, for example from 1 to 3 m without wishing to limit this invention by said numbers.

In other embodiments of the invention, a plurality of burner nozzles and a plurality of flames is used. A plurality of nozzles preferably is arranged in such a manner, that flames are present in the entire cross section of the combustion zone (a). An embodiment comprising a plurality of burner nozzles is schematically shown in FIG. 2. FIG. 3 shows schematically a view on the burner nozzles from above: 8 burner nozzles (3) arranged in the cylindrical reaction chamber in a circular manner. The flammable gas flows from the inlet (4) into a ring line (11), which feeds all of the burner nozzles with the flammable gas. The nozzles can be arranged vertically as shown in FIG. 3, but they may also be tilted a bit towards the center of the ring and/or the other direction. It is the aim of such an arrangement of the nozzles, that flames are present in the entire cross section of the combustion zone. In one embodiment, the nozzles may be tilted from the vertical center line by an angle from 1 to 30°.

The heating device furthermore comprises an entry (5) for a non-flammable gas as shown in FIG. 1. Such an additional non-flammable gas supports the transport of the hollow spherical glass particles towards to outlet and assists to avoid back-mixing. Examples of non-flammable gases comprise air, carbon dioxide or reused gas from the process itself.

The inner walls of the reaction chamber in the combustion zone (a) are preferably protected by a refractory material to withstand the high temperatures. Suitable refractory materials are known in the art. Examples comprise ceramic materials based on aluminium and/or silicon oxides or carbidic materials such as silicon carbide. Also, OCMC (oxide ceramic matrix composite) materials may be used. In one embodiment of the invention, the refractory materials are cooled. Such a cooling may be effectuated by using a reaction chamber which is doubled walled at least in the combustions zone (a). In other embodiments, also the cooling zone (b) may be double walled for the purposes of cooling. For cooling, preferably, a stream of a gas at ambient temperatures may be blown into the hollow space through an inlet and hot gas removed through an outlet. The hollow space between the two walls may be divided into several sections, each comprising an inlet and an outlet for a coolant, preferably a gas as outlined above, so that the walls of different zones of the reaction chamber can be cooled independently from each other.

FIG. 1 schematically represents a heating device comprising a reaction chamber comprising three different zones (6) for cooling the walls.

The heating device furthermore comprises an outlet (7). The outlet serves for removing the hollow spherical glass particles formed in course of the heat treatment from the reaction chamber. It furthermore serves for removing waste gas formed in course of combustion from the reaction chamber as well as for removing non-flammable gas injected into the reaction chamber.

The heating device furthermore comprises means for separating the hollow spherical glass particles from the waste gas and the non-flammable gas. Such a device may be a cyclone (8). The gases are removed through the outlet (9) and the hollow spherical glass particles are removed through another outlet (10). Of course, also other devices may be used for separation, such as for example filters.

In course of step (II) a stream of the precursor-particles is introduced into the heating device, thereby obtaining hollow spherical glass particles. Step (II) comprises at least 5 sub-steps (II-1), (II-2), (II-3), (II-4), and (II-5).

In course of step (II-1), a stream of the flammable gas is introduced through the inlet (4), transferred through a pipe to the burner nozzle(s) (3) which is/are located in the combustion zone (a) and a flame (2) is ignited.

In course of step (II-2), a stream of a non-flammable gas in introduced into the combustion zone (a) through the inlet (5) and transferred through the cooling zone (b) to the outlet (7). So, there is a stream of gas and particles in one direction from the inlet (5) to the outlet (7).

In course of step (II-3), the precursor-particles are added into the heating device and contacted with the naked flame(s) in the combustion zone (a), thereby obtaining a stream of hollow spherical glass particles, waste-gas generated by combustion of the flammable gas and non-non-flammable gas.

In a first embodiment of the invention, the precursor-particles are added to the stream of the flammable gas. Methods of adding solids to a stream of gas so that the solids may be transported with the stream of gas are basically known in the art. For example, the particles may be added into a swirl chamber which is flowed through by at least a part of the stream of the flammable gas.

In a second embodiment, the non-flammable gas acts as carrier gas for the precursor-particles and the precursor-particles are added to the stream of the non-flammable gas.

Of course, the precursor-particles may be added to both, the stream of the flammable gas and the stream of non-flammable gas. Furthermore, also other methods of adding the precursor-particles into the combustion zone and contacting them with the naked flame(s) may be applied.

The first embodiment is schematically represented in FIG. 1. The precursor-particles are dispersed in the flammable gas and the stream of flammable gas and precursor particles added through the inlet (4) and transported through a pipe to the burner nozzle(s) (3). The precursor-particles pass through the entire flame and are converted in the flame into hollow spherical glass particles.

The thus formed hollow spherical glass particles are transported by a stream of waste gas generated by the combustion through the heating unit towards the outlet (7). Furthermore, a non-flammable gas is introduced into the reaction chamber through the inlet (5) at a position upstream of the naked flame(s). It is the aim of using such an additional non-flammable gas to avoid back-mixing and to support the transport of the hollow spherical glass particles towards to outlet.

The second embodiment is schematically represented in FIG. 4. The heating device shown in FIG. 4 is similar to that shown in FIG. 1. It is heated by a plurality of flames (2) which are fed by a flammable gas which is entered into the heating device through the inlet (4). A stream of non-flammable gas is entered into the inlet (5) and precursor-particles are added to said stream of non-flammable gas. The stream of the non-flammable gas and the precursor-particles is introduced into the reaction chamber at a position upstream of the naked flame(s), so that it passes through the flames, thereby forming hollow spherical glass particles. As shown in FIG. 4, it is advantageous to use a plurality of flames, so that flames are present at essentially the entire cross section of the combustion zone (a). Such an arrangement ensures a good contact between the flames and the precursor particles and enable therefore high process efficiency. The heating device shown in FIG. 4 furthermore comprises a mixing chamber (12) in which the precursor particles (13) and a stream of a non-flammable gas (14) is pre-mixed. The pre-mix is then transferred into the main line through which the stream of non-flammable gas and precursor-particles is transported to the reaction chamber (1).

In the process according to the present invention, the contact time of the precursor-particles with the flame(s) is short. In one embodiment, it may be for example from 0.001 s to 1 s. The contact time mainly depends on the length of the flame. The flame velocity also is high. In one embodiment, it may be for example from 5 m/s to 100 m/s.

In course step (II-4) the stream of hollow spherical glass particles, waste gas and non-flammable gas is passed them through the cooling zone (b), thereby cooling the hollow spherical glass particles. In the cooling zone (b), the hollow spherical glass particles formed in the combustion zone are allowed to cool at least to a temperature at which the wall of the hollow spherical glass particles becomes solid. In general, cooling the hollow spherical glass particles to a temperature which is about 500° C. less than its respective melting temperature is sufficient without wishing to limit the invention to this range.

Cooling already starts simply when the particles are no longer in contact with the flame(s). In one embodiment of the invention, cooling is supported by entering a non-flammable gas such as air, nitrogen, carbon dioxide or reused waste gas, preferably having ambient temperature, into the cooling zone. In this embodiment, the reaction chamber comprises suitable means, such as for example lead-in tubes, which allows entering a cooling gas into the cooling zone (b).

Preferably, the lead-in tubes may be arranged in such a manner that a part of the stream of injected gas is directed to the interior of the reaction chamber and that a part of the stream flows essentially parallel to the wall. Such an arrangement helps to avoid that the hollow spherical glass particles formed stick to the walls. Cooling the walls as already outlined above can support cooling.

FIG. 5 schematically shows one embodiment of a heating device in which a non-flammable gas is entered into the cooling zone (b). The heating device depicted in FIG. 5 is horizontal. It comprises the elements of the heating device as already shown in FIGS. 1 and 4. The precursor-particles are added to a stream of a non-flammable gas. Additionally, the cooling zone (b) comprises inlets (16) for a non-flammable gas. The inlets are arranged in such a manner that the cooling gas streams downstream along the reactor wall so that the reactor wall is cooled. FIG. 5 also shows two optional elements which may be used: The inner walls of the reaction chamber in the combustion zone (a) are preferably protected by a refractory material (17) to withstand the high temperatures. Furthermore, the heating device comprises flow straighteners (18) which assist to avoid back-mixing.

FIG. 6 schematically shows another embodiment of entering a cooling gas into the cooling zone. The reaction chamber comprises openings (22) through which air from the outside is sucked into the reaction chamber and the air sucked in streams along the reactor wall. A plurality of such openings may be arranged in a circumferential manner. In one embodiment, the openings (22) may be arranged at the beginning of cooling zone (b) as shown in FIG. 6, but they may also be arranged at a more downstream position. Of course, a plurality of such opening may be arranged at different distances from the flames(s) in the streaming direction. Furthermore, FIG. 6 shows one further embodiment of the invention, namely two-component nozzles (23) which are fed with separate streams of air (21) and the flammable gas (20).

In course of step (II-5) the hollow spherical glass particles are separated from the exhaust gas flow. Such a separation may be carried out by usual technologies. In one embodiment of the invention, a cyclone is used. FIGS. 1, 4, and 5 schematically show heating devices equipped with a cyclone (8) for separating the hollow spherical glass particles. The gases are removed through the outlet (9) and the hollow spherical glass particles are removed through another outlet (10). Of course, the also other devices may be used may be used for separation, such as for example filters. The gases may comprise residual amounts of fine particles which may be separated with an additional filter, for example an electro filter.

Figure 7:
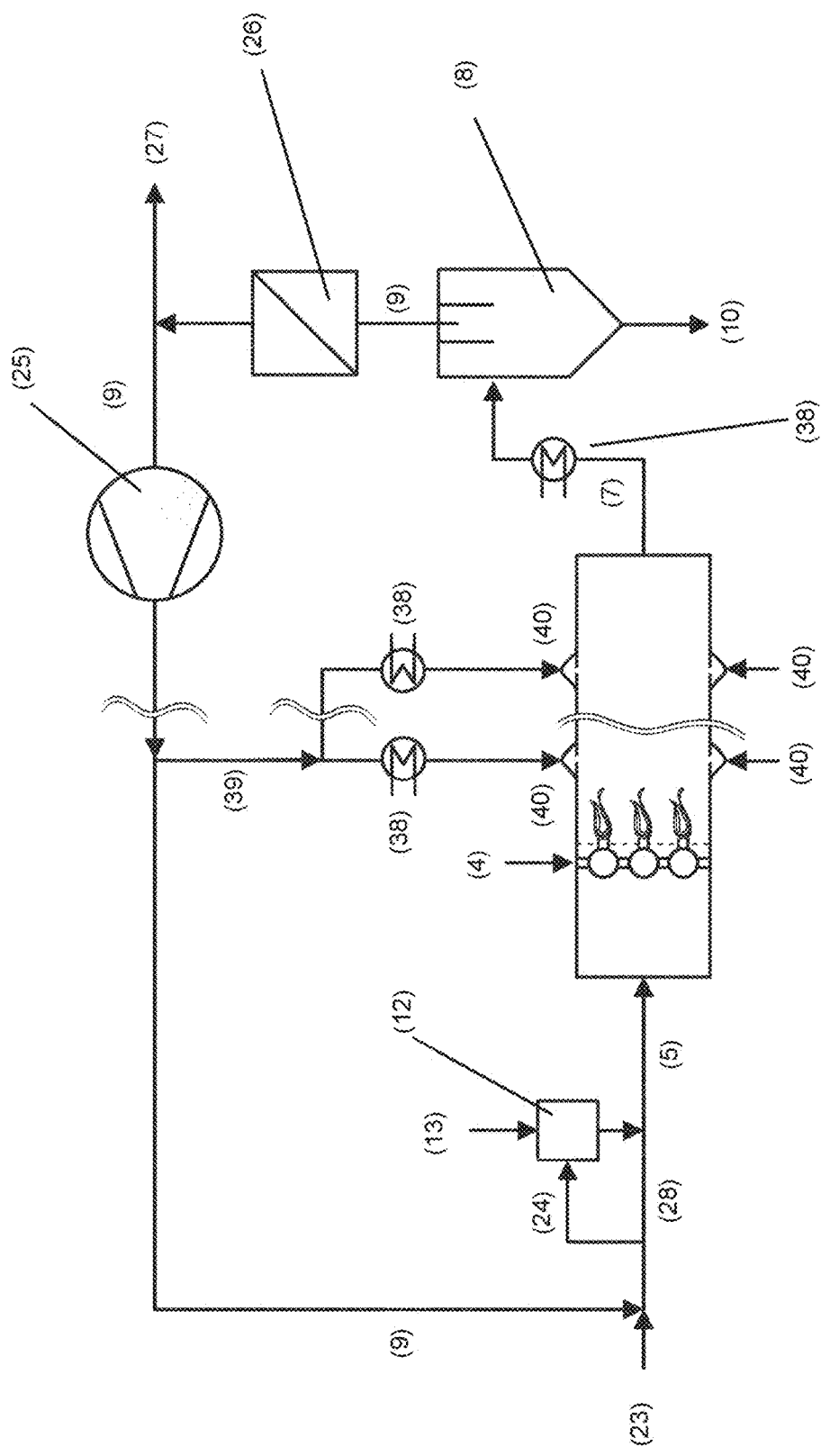

FIG. 7 shows a process flow diagram of one embodiment of a plant for manufacturing hollow spherical glass particles according to the process according to the present invention. It shows the reaction chamber (1) as described in detail above in which hollow spherical glass particles are manufactured as described above. The resultant product stream comprising waste gas and the hollow spherical glass particles is transferred through the outlet (7) to the cyclone (8) where the hollow spherical glass particles are separated from the gas stream and removed through an outlet (10). The line between the outlet and the cyclone comprises a heat exchanger (38) to further reduce the temperature of the stream comprising waste gas and the hollow spherical glass particles before it enters into the cyclone (8). The waste gas stream (9) is transferred through an electro filter (26) for removing residual fractions solids from the waste gas stream.

The waste gas stream (9) may be removed through the exit (27) and or recirculated by means of the compressor (25) to the reactor. Fresh non-flammable gas may be entered through the inlet (23). The stream of waste gas and/or fresh gas is divided and a partial stream (24) is introduced into the mixing chamber (12). The second partial stream (28) directly flows to the inlet (5). Into the mixing chamber (12), also precursor particles (13) are entered in and mixed with the partial gas stream (24). The obtained, concentrated stream of precursor-particles and waste gas and/or fresh gas is entered into second partial stream (28) and the combined streams entered through the inlet (5) into the reaction chamber. A part of the waste gas stream (39) may be branched-off, cooled by one or more than one heat exchanger(s) (38) and entered into the reaction chamber using inlets (40) for cooling purposes at outlined above. The plant shown in FIG. 7 may be operated with fresh non-flammable gas which is entered through the inlet (23). In other embodiments, only a part of the waste gas formed in course of the reaction is removed through the exit (27) and another part is recycled and reentered into the reaction chamber.

In other embodiments of the present invention, the heating device used for step (II) comprises at least an inlet for a flammable gas, optionally an inlet for a non-flammable gas, a cylindrical, rotatable reaction chamber which is rotatably mounted at its ends in a fixed front unit and a fixed rear unit, wherein the rotatable, cylindrical reaction chamber is arranged horizontal or inclined towards its rear end, and wherein the rotatable, cylindrical reaction chamber comprises at least two different zones (a) and (b), wherein (a) is a combustion zone capable of being heated by least one naked flame, wherein at least one burner nozzle which is connected with the inlet for the flammable gas is arranged in the combustion zone, and (b) is a cooling zone, a fixed front unit comprising at least a mounting for the cylindrical, rotatable reaction chamber, an inlet for a stream of a flammable gas which is connected with the burner nozzle arrange in zone (a), and optionally an inlet for a non-flammable gas, a fixed rear unit comprising at least a mounting for the cylindrical, rotatable reaction chamber, an outlet for hollow spherical glass particles and an outlet for waste gas, and means for rotating the cylindrical, rotatable reaction chamber around its longitudinal axis and step (II) is carried out as follows:

(II-0') rotating the cylindrical, rotatable reaction chamber around its longitudinal axis, (II-1') introducing a stream of the flammable gas through the inlet, transferring it to the burner nozzle(s) and igniting at least one naked flame, (II-2') optionally introducing a stream of a non-flammable gas through the inlet and trans transferring it through the reaction chamber to the outlet, (II-3') adding the precursor-particles into the heating device and contacting them with the naked flame(s) in the combustion zone (a) by adding the precursor-particles to the stream of the flammable gas, and/or adding the precursor-particles to the stream of the non-flammable gas, thereby obtaining hollow spherical glass particles in a waste gas stream, (II-4) cooling the hollow spherical glass particles in the waste gas stream by passing them through the cooling zone (b) by means of the rotational movement o, and (II-5') removing the hollow spherical glass particles through the outlet for hollow spherical glass particles of the fixed rear unit and/or by separating the hollow spherical glass particles from the waste gas flow exiting through the waste gas outlet.

FIG. 8 schematically represents a specific embodiment of such a heating device. The heating device comprises a fixed front part (30) and a fixed rear part (31). A cylindrical, rotatable reaction chamber (29) which is rotatably mounted at its ends in the front unit (30) and in the rear unit (31). The inner diameter of the cylindrical reaction chamber may be for example from 0.1 to 3 m, for example from 1 to 3 m without wishing to limit this invention by said numbers.

The rotatable reaction chamber comprises a combustion zone (a) which is heated by at least one naked flame (2), preferably a plurality of flames and a cooling zone (b).

Details have already been described above and we refer to the corresponding sections above. The inner walls of the reaction chamber in the combustion zone (a) are preferably protected by a refractory material to withstand the high temperatures. Suitable refractory materials have already been mentioned above.

The fixed rear unit also comprises at least a mounting (32) for the cylindrical, rotatable reaction chamber, and furthermore an outlet for hollow spherical glass particles (34) and an outlet for at least waste gas (35) but also at least a part of the hollow spherical glass particles may be removed from the heating unit through the outlet (35). The outlet (34) preferably is at the bottom of the fixed rear unit so that the hollow spherical glass particles may be removed by means of gravity. The outlet (35) may optionally be connected with a unit for separating hollow spherical glass particles from the waste gas stream, for example a filter or a cyclone as described above.

The heating unit furthermore comprises means (33) for rotating the cylindrical, rotatable reaction chamber around its longitudinal axis.

FIG. 9 schematically shows another embodiment of a heating unit comprising a rotatable reaction chamber. In this embodiment, the inner wall of the combustion zone (a) is protected by a layer of a refractory material (36) and it furthermore comprises inlets for air (37) for cooling the walls of the cooling zone (b).

The rotatable, cylindrical reaction chamber is arranged horizontal or inclined towards its rear end. If the reaction chamber is inclined, the inclination angle of the cylindrical, rotatable reaction chamber may be from more than 0° to 20°, preferably from more than 0° to 10°. The transport of the hollow spherical glass particles may be affected by rotation the cylindrical reaction chamber alone, especially in connection with inclining the reaction chamber. In other embodiments, the cylindrical, rotatable reaction chamber comprises installations in its interior to support transport of the material such as for instance a screw. Of course, also the waste gas stream and optionally a stream of additional non-flammable gas may support transport of the products through the rotatable reaction chamber.

FIGS. 10 and 11 schematically shows an embodiment, in which the fixed front unit of the heating unit additionally comprises an inlet (5) for a non-flammable gas. In FIG. 10, the precursor particles are added to the stream of the flammable gas and in FIG. 11, the precursor-particles are added to the non-flammable gas.

Step (II) of the present embodiment of using a heating unit comprising a rotatable reaction chamber comprises at least 5 sub-steps (II-0'), (II-1'), (II-3'), (II-4'), and (II-5'). Optionally, the process can additionally comprise step (II-2').

In course of step (II-0'), the cylindrical, rotatable reaction chamber is rotated around its longitudinal axis. The rotational speed may be selected by the skilled artisan and may be for example from 0.5 to 10 revolutions per minute (rpm).

In course of step (II-1'), a stream of the flammable gas is introduced through the inlet (4), transferred through a pipe to the burner nozzle(s) (3) which is/are located in the combustion zone (a) and a flame (2) is ignited.

In course of step (II-3'), the precursor-particles are added into the heating device and contacted with the naked flame(s) in the combustion zone (a), thereby obtaining a stream of hollow spherical glass particles, waste-gas generated by combustion of the flammable gas and non-non-flammable gas.

In a first embodiment of step (II-3'), the precursor-particles are added to the stream of the flammable gas. Details about adding the precursor particles to the stream of the flammable gas have already been mentioned above. Methods of adding solids to a stream of gas have already been described above. For example, a mixing chamber as described above may be used. Such an embodiment is schematically shown in FIGS. 8, 9, and 10. In one embodiment, which is schematically shown in FIG. 10, an additional stream of non-flammable gas is entered in through the inlet (5). As indicated above, such an additional non-flammable gas may assist to avoid back-mixing and to support the transport of the hollow spherical glass particles towards to outlet.

In a second embodiment of step (II-3'), the fixed front unit additionally comprises an inlet (5) for a non-flammable gas as indicated in FIG. 11, and the process comprises a step (II-2'), in which a stream of a non-flammable gas in introduced into the heating device through said inlet (5) and transferred through the rotating reaction chamber (29) to the outlet (35). The precursor-particles are added to the stream of non-flammable gas. So, in this embodiment, the non-flammable gas acts as carrier gas.

In course step (II-4') the stream of hollow spherical glass particles, waste gas and optionally non-flammable gas is passed them through the cooling zone (b), thereby cooling the hollow spherical glass particles. As already detailed above, in the cooling zone (b), the hollow spherical glass particles formed in the combustion zone (a) are allowed to cool to at least a temperature at which the wall of the hollow spherical glass particles becomes solid. In one embodiment of the invention, cooling is supported by entering a non-flammable gas such as air or nitrogen, preferably having ambient temperature, into the cooling zone. In this embodiment, the reaction chamber comprises suitable means, such as for example lead-in tubes, which allows entering a cooling gas into the cooling zone (b). Preferably, lead-in tubes may be arranged such that a stream of injected gas flows essentially parallel to the wall. Such an arrangement helps to avoid that the hollow spherical glass particles formed stick to the walls.

In course of step (II-5') the hollow spherical glass particles are removed from the heating device through the outlet (34) of the fixed rear unit and/or the hollow spherical glass particles are separated from the waste gas flow or optionally from the stream of waste gas and non-flammable gas additionally injected which exits through the outlet (35). As indicated above for such a separation for example a filter unit or a cyclone may be used.

Devices for Carrying Out the Process

In another embodiment, the present invention relates to a heating device for heat-treating precursor-particles comprising $SiO_2$, $Al_2O_3$, and an alkali metal oxide at a temperature from 1000 to 1800° C. thereby obtaining hollow spherical glass particles, comprising at least a longitudinal reaction chamber comprising at least two different zones (a) and (b), wherein (a) is a combustion zone capable of being heated by least one naked flame, wherein at least one burner nozzle which is connected with an inlet for the flammable gas is arranged in the combustion zone, (b) is a cooling zone, and an inlet for the flammable gas, an inlet for introducing a non-flammable gas into the combustion zone (a), means for adding precursor-particles comprising $SiO_2$, $Al_2O_3$, and an alkali metal oxide to the flammable gas and/or the non-flammable gas, an outlet for removing hollow spherical glass particles, non-flammable gas and waste from the cooling zone (b).

Details of such a heating device including preferred embodiments have already been disclosed above and we refer to the respective passages of the specification above.

In yet another embodiment, the present invention relates to a heating device for heat-treating precursor-particles comprising $SiO_2$, $Al_2O_3$, and an alkali metal oxide at a temperature from 1000 to 1800° C. thereby obtaining hollow spherical glass particles, comprising at least an inlet for a flammable gas, optionally an inlet for a non-flammable gas, a cylindrical, rotatable reaction chamber which is rotatably mounted at its ends in a fixed front unit and a fixed rear unit, wherein the rotatable, cylindrical reaction chamber is arranged horizontal or inclined towards its rear end, and wherein the rotatable, cylindrical reaction chamber comprises at least two different zones (a) and (b), wherein (a) is a combustion zone capable of being heated by least one naked flame, wherein at least one burner nozzle which is connected with the inlet for the flammable gas is arranged in the combustion zone, and (b) is a cooling zone, a fixed front unit comprising at least a mounting for the cylindrical, rotatable reaction chamber, an inlet for a stream of a flammable gas which is connected with the burner nozzle arrange in zone (a), and optionally an inlet for a non-flammable gas, a fixed rear unit comprising at least a mounting for the cylindrical, rotatable reaction chamber, an outlet for hollow spherical glass particles and an outlet for waste gas, and a drive for rotating the cylindrical, rotatable reaction chamber around its longitudinal axis.

Details of such a heating device including preferred embodiments have already been disclosed above and we refer to the respective passages of the specification above.

Use of the Hollow Spherical Glass Particles

The invention furthermore relates to the use of hollow spherical glass particles comprising at least $SiO_2$, $Al_2O_3$, and an alkali metal oxide as filler for high temperature products, molten metal, injection molded synthetic materials, flame-retardant insulating foams, cement slurries, mortars, concretes and oil field applications, wherein the hollow spherical glass particles are manufactured by a process as described above.

In yet another embodiment, the invention relates to the use of hollow spherical glass particles comprising at least $SiO_2$, $Al_2O_3$, and an alkali metal oxide as additive for molten metals having a melting point of at least 500° C., wherein the hollow spherical glass particles are manufactured by a process as described above.

Details of the hollow spherical glass particles including preferred embodiments and details of the process including preferred embodiments have already been disclosed above and we refer to the respective passages of the specification above.

Preferably, the hollow spherical glass particles to be used as described above comprise at least 30 wt.-% of $SiO_2$, at least 25 wt.-% of $Al_2O_3$, and at least 18 wt.-% of the alkali metal oxide, preferably $Na_2O$ in each case based on the overall weight of the hollow spherical glass particles and are free of boron. Furthermore, preferably the average diameter of the hollow spherical glass particles to be used as described above is from 20 μm to 200 μm.

In the process for making such particles to be used as described above preferably a starting composition comprising at least a zeolite, a clay and an alkali metal carbonate is used and the temperature of the heat-treatment is from 1300° C. to 1600° C.

Advantages of the Present Invention

The described process according to the present invention of heat-treating the precursor particles by contacting them with at least one naked flame for obtaining hollow spherical glass particles has advantages over prior art.

Because the heating device is internally heated by naked flame(s) and heat-treatment is carried out by contacting the precursor-particles with the naked flame(s), there is no problem of heat-transfer into the heating device and therefore advantageously, the inner diameter of the cylindrical heating device may be made very large. It may be for example from 0.1 to 3 m, for example from 1 to 3 m without wishing to limit this invention by said numbers. Enabling such large diameter facilitates significantly the construction of production plants having a high capacity. The scale up from laboratory or pilot production plants is facilitated by simply enlarging the number of burner nozzles and the diameter of the reaction chamber.

The invention claimed is:

1. A process for the preparation of hollow spherical glass particles comprising at least $SiO_2$, $Al_2O_3$, and an alkali metal oxide, comprising at least the steps of (I) preparing precursor-particles by a process comprising at least the following substeps (I-1) providing a starting composition comprising particles of at least one starting compound for forming a glass which comprises at least $SiO_2$, $Al_2O_3$, and an alkali metal oxide, (I-2) mixing the starting composition with a liquid, thereby obtaining a slurry, and (I-3) spray drying the obtained slurry, thereby obtaining the precursor-particles, and (II) heat-treating the precursor-particles at a temperature from 1000° C. to 1800° C. by passing the precursor-particles through a heating device, thereby obtaining hollow spherical glass particles, wherein at least one naked flame fed by a flammable gas is burning in an interior of the heating device, and the heat-treatment is carried out by contacting the precursor-particles with the naked flame(s), wherein the precursor-particles are dispersed in the flammable gas which feeds the flame(s) in the heating device and/or the precursor-particles are dispersed in a non-flammable gas which is added into the heating device at a position upstream of the flame(s), and wherein the heating device comprises a plurality of burner nozzles and consequently a plurality of flames are burning in the interior of the heating device.

2. The process according to claim 1, wherein the heating device has a longitudinal reaction chamber.

3. The process according to claim 2, wherein the reaction chamber is cylindrical.

4. The process according to claim 1, wherein the hollow spherical glass particles obtained are cooled after being in contact with the naked flame(s) in at least one cooling zone by at least one method selected from introducing a gas into the reaction chamber, and cooling the walls of the reaction chamber.

5. The process according to claim 1, wherein the heating device used for step (II) comprises at least an inlet for the flammable gas, an inlet for the non-flammable gas, a longitudinal reaction chamber comprising at least two different zones (a) and (b), wherein (a) is a combustion zone capable of being heated by the at least one naked flame, wherein at least one burner nozzle which is connected with the inlet of the flammable gas is arranged in the combustion zone, (b) is a cooling zone, and an outlet for the hollow spherical glass particles, non-flammable gas and waste, and step (II) is carried out as follows:

(II-1) introducing a stream of the flammable gas through the flammable gas inlet, transferring the stream of the flammable gas to the burner nozzle(s) and igniting the at least one naked flame, (II-2) introducing a stream of the non-flammable gas through the non-flammable gas inlet into the combustion zone (a) and transferring the stream of the non-flammable gas through the cooling zone (b) to the outlet, (II-3) adding the precursor-particles into the heating device and contacting the precursor-particles with the naked flame(s) in the combustion zone (a) by at least one method selected from adding the precursor-particles to the stream of the flammable gas, and/or adding the precursor-particles to the stream of the non-flammable gas, thereby obtaining a stream of hollow spherical glass particles, waste-gas generated by combustion of the flammable gas and non-flammable gas, (II-4) cooling the formed stream of hollow spherical glass particles, waste-gas and nonflammable gas by passing the formed stream through the cooling zone (b), and (II-5) separating the hollow spherical glass particles from the waste-gas and the nonflammable gas.

6. The process according to claim 5, wherein the reaction chamber comprises at least two cooling zones and cooling is carried out in at least two steps.

7. The process according to claim 1, wherein the heating device used for step (II) comprises at least an inlet for the flammable gas, optionally an inlet for the non-flammable gas, a cylindrical, rotatable reaction chamber which is rotatably mounted at a front end of the cylindrical, rotatable reaction chamber and a rear end of the cylindrical, rotatable reaction chamber in a fixed front unit and a fixed rear unit, respectively, wherein the cylindrical, rotatable reaction chamber is arranged horizontal or inclined towards the rear end of the cylindrical, rotatable reaction chamber, and wherein the cylindrical, rotatable reaction chamber comprises at least two different zones (a) and (b), wherein (a) is a combustion zone capable of being heated by the at least one naked flame, wherein at least one burner nozzle which is connected with the inlet for the flammable gas is arranged in the combustion zone, and (b) is a cooling zone, the fixed front unit comprising at least a mounting for the cylindrical, rotatable reaction chamber, the inlet for the flammable gas which is connected with the burner nozzle arranged in zone (a), and optionally the inlet for the non-flammable gas, the fixed rear unit comprising at least a mounting for the cylindrical, rotatable reaction chamber, an outlet for hollow spherical glass particles and an outlet for waste gas, and a drive for rotating the cylindrical, rotatable reaction chamber around its longitudinal axis and step (II) is carried out as follows:

(II-0') rotating the cylindrical, rotatable reaction chamber around its longitudinal axis, (II-1') introducing the stream of the flammable gas through the flammable gas inlet, transferring the stream of the flammable gas to the burner nozzle(s) and igniting the at least one naked flame, (II-2') optionally introducing the stream of the non-flammable gas through the non-flammable gas inlet into the combustion zone (a) and transferring the stream of the non-flammable gas through the cooling zone (b) to the outlet, (II-3') adding the precursor-particles into the heating device and contacting them with the naked flame(s) in the combustion zone (a) by adding the precursor-particles to the stream of the flammable gas, and/or adding the precursor-particles to the stream of the non-flammable gas, thereby obtaining hollow spherical glass particles in a waste gas stream, (II-4') cooling the hollow spherical glass particles in the waste gas stream by passing them through the cooling zone (b) by means of the rotational movement, and (II-5') removing the hollow spherical glass particles through the outlet for hollow spherical glass particles of the fixed rear unit and/or by separating the hollow spherical glass particles from the waste gas flow exiting through the waste gas outlet.

8. The process according to claim 7, wherein the combustion zone (a) comprises a plurality of nozzles for flammable gas.

9. The process according to claim 8, wherein the plurality of nozzles is arranged in such a way, that flames are present in an entire cross section of the combustion zone (a).

10. The process according to claim 7, wherein the waste gas formed in course of combustion and non-flammable gas separated in course of step (II-5') is recirculated.

11. The process according to claim 1, wherein at least a portion of a waste stream is cooled and enters the heating device for cooling purposes.

\* \* \* \* \*